Sept. 2, 1941.  R. M. DILWORTH  2,254,475
GENERATING ELECTRIC TRACTION CONTROL SYSTEM
Filed May 31, 1940
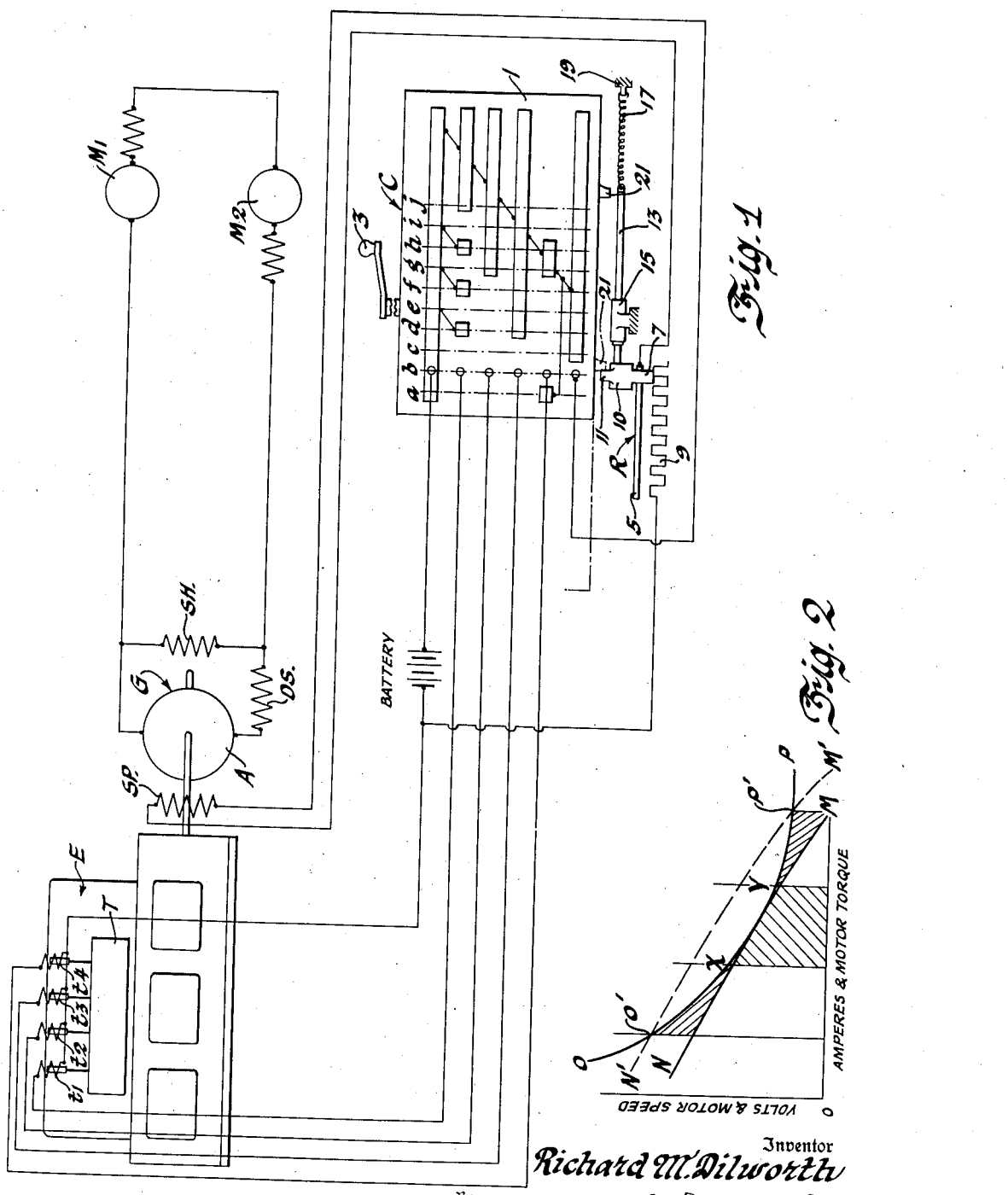
Inventor
Richard M. Dilworth
By
Blackmore, Spencer & Flint
Attorneys Patented Sept. 2, 1941

2,254,475

UNITED STATES PATENT OFFICE 2,254,475

GENERATING ELECTRIC TRACTION CONTROL SYSTEM

Richard M. Dilworth, La Grange, Ill., assignor to General Motors Corporation, Detroit, Mich., a corporation of Delaware Application May 31, 1940, Serial No. 338,005

10 Claims. (Cl. 290—17)

The present invention relates to improvements in control mechanisms for generating electric traction systems.

In conventional generating electric traction systems comprising a driving motor supplied with power from a generator which is driven by a prime mover it is necessary that control means be provided to regulate the power output of both the prime mover and the generator so that the output characteristics thereof conform to the power demand characteristics of the traction motor or motors. On vehicles such as locomotives series type traction motors are usually provided which, at low vehicle speeds for constant prime mover power output, require high amperage and fairly low voltage, and at high speeds require higher voltage and lower amperage. The torque of a series motor is proportional to the amperage and inversely proportional to the speed of the motor and therefore the vehicle speed. The amperage and voltage required by the motor for constant power output of the prime mover and for variable vehicle and motor speed when plotted with volts and amperes as the coordinates is an equilateral hyperbola.

In order, therefore, to obtain maximum efficiency from the traction system the generator output should follow the hyperbolic curve mentioned above for constant output of the prime mover, which is substantially equal to the input power to the generator.

Various types of generator excitation control means have been used to obtain the required generator regulation. These controls usually include a plurality of generator excitation windings, both self and separately excited, with means to vary the excitation current in certain of these windings, as inherent regulation of the generator by these windings alone only satisfies the motor demand for a very limited range of motor speed and torque values. For wide variations of motor speed beyond this limited range automatic and manually operable control means are usually provided to regulate the volt-ampere output of the generator to conform to the prime mover output and the voltage and amperage requirements of the motor. Automatic speed and output regulating means for the prime mover are also usually provided which serve to maintain constant speed and output thereof by regulating the amount of motive fluid supplied to the prime mover and at the same time regulating the generator excitation and therefore the load on the prime mover to prevent overloading or overspeeding thereof. The number of automatic devices necessary to accomplish such regulation of the power generating units, together with the interlocking means therefor and manual means for modifying the response of these automatic means, makes these control systems very expensive and difficult to keep in adjustment.

The principal object of the present invention, therefore, is to provide simple and inexpensive manually operable means only to control the power generating means of a vehicle driving system so that the output characteristics thereof will conform to the requirements of the traction motors for widely variable values of motor speed and torque.

Another object is the provision of means included in the manually operable control means whereby the physical effort required for operation of the manual means is made proportional to the increase in power output of the generator above the inherent regulation curve and up to the available output of the prime mover to satisfy the requirements of the traction motors in starting, acceleration, and high speed operation of the vehicle, so that the vehicle operator is made aware of these higher output values from the generator by the manual effort necessary to hold the controls in this position, and he will naturally, therefore, not maintain these controls in a position to overload the prime mover for normal speed and loads of the traction motors.

The means by which the above objects are accomplished will be better understood by referring to the following detailed description and drawing illustrating my improved control means.

Figure 1 of the drawing shows the power units and control apparatus therefor in diagrammatic form; and Figure 2 shows the power output and power demand curves obtained by the control means.

Referring to Figure 1, a plurality of driving motors of the series traction type are shown at M1 and M2, which may be operatively connected to drive a vehicle, not shown, in any convenient manner, and which are shown electrically connected in series across a source of power.

The source of power or generator G has an armature A which is mechanically connected to and driven by a prime mover E of any well known type, such as a Diesel engine, which is usually used on locomotive vehicles. The generator G is provided with a plurality of excitation windings shown at SH, SP and DS which are, respectively, the shunt, separate, and differential series excitation windings. The self excited windings, namely, the shunt and differential series field windings in which the voltage across and the current values flowing therein are variable due to variations in motor speed and load, together with the excitation by the separately excited winding SP in which the current is normally held at a constant value, as will be described, give inherent regulation of the generator and a drooping voltage characteristic for an increase in motor load current and torque with a decrease in motor speed. This generator characteristic curve is indicated at N—M in Figure 2. The demand characteristic curve of the motors for variable speed at constant power input is indicated at O—P. The coordinates of these curves are, respectively, volts and amperes. As the torque of these motors is proportional to the current in amperes and the motor speed is proportional to voltage, these values are indicated alongside coordinates of the curves. The demand characteristic curve O—P of the motors is an equilateral hyperbola and, therefore, the product of volts and amperes at any point of the curve is equal to a constant value of power input in volt-amperes which is supplied by the prime mover E, the output of which is regulated to this value at a given speed. It will be observed that the generator characteristic curve N—M is substantially tangent to the motor demand curve O—P between the points X and Y only for inherent generator regulation, and the curve N—M lies below the curve O—P for values of motor speed and torque above and below the values in the range X—Y, which may be assumed to be average values. As previously explained, large values of current are required by the motor at low speed and comparatively low voltage to obtain large values of starting torque for starting and acceleration of the vehicle, and higher values of voltage with lower values of current and torque are required by the motors to drive the vehicle at higher speeds. The following simplified control means is therefore provided to control and regulate the prime mover and generator to satisfy these motor requirements and make the generator output curve conform to the hyperbolic motor input curve O—P.

In order to vary the speed and power output of the prime mover E and therefore the output of the generator G, the prime mover E is provided with speed and output varying means shown generally at T, which includes means, not shown, such as the usual motive fluid regulator of the prime mover and suitable linkage connected thereto whereby the prime mover speed and output may be adjusted to any one of a plurality of values. This linkage may be moved by any well known means, for example, by a plurality of electromagnetic devices shown at $t1$, $t2$, $t3$ and $t4$. Each of these devices includes a magnet winding and a plunger operatively connected to the linkage for operating the prime mover motive fluid regulator upon energization of the magnet winding. The linkage may be arranged so that by causing energization of one or more windings of these devices separately or in combination, the speed and output of the prime mover may be set to any one of a plurality of values between zero output and speed up to the maximum available output at a given prime mover speed.

A master controller C is provided to control energization of the devices $t1$ to $t4$ to control the prime mover output and also serves to regulate the generator excitation, as will be explained later. The controller shown is a drum type, having an insulated drum 1 shown in developed form; however, any other type of controller may be used if desired. The drum 1 has an operating handle 3 fixed thereto by which it may be moved to any one of a plurality of positions indicated by the dotted lines $a$ to $j$, inclusive, and may also be moved to the left beyond the position $j$ for reasons to be described later. A plurality of interconnected electrical contacts are fixed to the drum and a plurality of fixed contacts are located in alignment with the contacts on the drum so that certain of the fixed contacts will be contacted by the movable contacts for each position of the controller. The upper drum contact is of sufficient length so that movement of the drum to any of the various positions will not cause it to be moved out of contact with the upper fixed contact, which is shown connected to one terminal of the battery, the other terminal of which is connected to one end of each of the magnet windings of the devices $t1$ to $t4$. The other ends of each of these windings are connected to one of the four fixed contacts located immediately below the upper fixed contact. The contacts on the drum movable into contact with these four fixed contacts are located so that the windings of the devices $t1$ to $t4$ controlling the prime mover output are energized singly or in combination so that the output of the prime mover is increased when the drum is moved to the left from the position $b$ to position $j$. When in position $j$ or beyond this position to the left, the prime mover output is at its maximum value. When the drum is moved to the right of position $b$ to position $a$ the prime mover is stopped.

The lower fixed contact of the controller is connected to one terminal of the separately excited field winding SP, the other terminal of which is connected to a fixed contact 5 forming a part of a generator output regulating device shown generally at R, which is a variable resistance having a sliding contact 7 held in contact with a fixed contact 5 and a resistance unit 9, one side of which is connected to the battery terminal opposite the one connected to the upper fixed contact of the controller. The length of the lower drum contact is such that it will make contact with the lower fixed contact for all of the controller positions except position $a$, and when this contact is made the battery is connected in series with the separately excited field winding SP and the generator output regulating means R. The contact 7 of this variable resistor is fixed to a member 10 having an upwardly projecting lug 11 and an extension 13 movably supported in any convenient manner, for example, slidably mounted, as shown, in a fixed member 15. A tension spring 17 is attached between the extension 13 of the member 10 and a fixed member 19, and tends to hold the contact 7 in the position shown, in which a predetermined value of resistance is placed in series between the battery and the separately excited field winding SP. The member 10 and the contact 7 fixed thereto are moved to the left of their normal position by a lug 21 fixed on the controller drum 1 when the drum is moved to the left of the position $j$. The lug 21 makes contact with the lug 11 on the member 10 when the drum 1 and lug 21 are in the dotted line position shown. Further movement of the drum and contact 7 to the left causes the excitation current in the separately excited field winding SP to be increased as the value of the resistance in the regulating means R is accordingly decreased, which causes the generator output to be increased so that an increase in amperage or voltage may be supplied to the motor to satisfy the motor demand for low or high speed values beyond that of the normal speed range where inherent generator regulation is provided. The spring 17 tends to oppose movement of the contact 7 to the left and also movement of the drum, so that the manual effort necessary to cause this movement is proportional to the increase in generator output above that where inherent generator regulation of the output occurs, with the contact 7 in the normal position and a predetermined value of resistance in the generator output regulating device.

The operation of the control system is, briefly, as follows:

The controller drum 1 is freely movable from position $a$ in which the prime mover is stopped up to the position $j$ at which the prime mover output is maximum at a value necessary to supply the constant power demand of the traction motors for variable values of speeds and loads. As the contact 7 of the generator output regulating device is now in the normal position as shown, the current flowing in the separately excited field SP from the battery is limited to a constant value by the resistance in the regulator R, and the excitation current in the self excited windings SH and DS depends upon the line voltage and line current which for variable motor speeds varies as shown by the curve O—P. The generator regulation curve, when all of the above mentioned excitation windings are so energized, is indicated at N—M, which conforms to the curve O—P only in the limited speed and torque range indicated by the points X and Y on these curves. For an increase in speed of the motors beyond the point X the generator output must be increased to give higher voltage to correspond to the curve O—P, and for a decrease in motor speed beyond point Y the generator output must be increased to give a higher current in order to correspond to the curve O—P. The portion O—X of the curve O—P corresponds to high speed demand requirement of the motor and the portion Y—P of the curve O—P corresponds to high torque low speed demand requirements of the motors for starting or accelerating the vehicle. As has been explained, movement of the contact 7 of the generator output regulating means R by movement of the controller drum 1 beyond the position $j$ by means of the controller handle 3 is opposed by the force of the spring 17 which increases in proportion to the amount of movement of the contact 7. Movement of the contact 7 in this direction decreases the resistance in series with the separately excited field winding SP and raises the generator output proportional to the distance the contact 7 is moved, the manual effort required to move the drum and contact depending upon the spring rate. The generator output curve resulting from such movement of the contact 7 may now be indicated by the dotted curve N'M' so that the motor demand requirement for the high and low speed motor operation is met. When the generator output follows the curve N'M' a reduction in the motor speed from point O' or an increase in motor speed from point P' will cause overloading of the prime mover E, and its speed and the speed of the vehicle will drop. These speed changes will be felt by the operator and these, together with the physical effort required by him to maintain the control handle in a position to cause this increased generator output and load on the engine, will naturally cause him to release the control handle, and the drum 1 will then be moved back to position $j$ by the spring 17 where inherent regulation of the generator again takes place and the generator load on the engine is reduced to the available engine output.

With the above described control system it has been found that locomotive engineers have a natural reaction urging them to exert more pressure on a control handle when increased torque or power is demanded for starting or for increasing the vehicle speed, and conversely, a natural reaction urging them to lessen pressure on the control handle when the locomotive is operating at average torque and speed so that this simplified control satisfies these natural reactions. In addition to the above advantages offered by the control system, it requires practically no adjustments or maintenance as very low values of current are required to accomplish the necessary regulation of the generator and prime mover output characteristics to meet the demand characteristics of the traction motors for widely variable speeds and torque values needed for locomotive service, where widely variable values of speed, tractive force and drawbar horse power demand values must be provided.

It will be evident that the output regulator R may be used to regulate the excitation current in the shunt field SH instead of the separately excited field SP, if desired, or that a separate regulator operated in a like manner may be included in series with each of these excitation windings and the resistance per unit of movement of the contact 7 and rate of the spring 17 may be selected for the characteristics desired.

I claim:

1. A generating electric traction control system for vehicles comprising a traction motor; a generator electrically connected to the motor; a prime mover for driving the generator; prime mover output regulating means; a plurality of generator excitation windings to give inherent output regulation of the generator to satisfy the motor power demand for a limited speed range only; generator output regulating means for varying the excitation of one of the excitation windings to make the generator output characteristics conform to the motor power demand for motor speed values outside said limited speed range; manually movable means to control the prime mover output regulating means and the generator output regulating means; and force varying means for said manually movable means whereby the force necessary to move the manually movable means in controlling said generator output regulating means is proportional to the variation in generator output caused by said generator output varying means.

2. A generating electric traction control system for vehicles comprising a traction motor; a generator electrically connected to the motor; a prime mover for driving the generator; prime mover output regulating means; a plurality of generator excitation windings to give inherent output regulation of the generator to satisfy the motor power demand for a limited speed range only; a manually operable controller for controlling said prime mover output regulating means, said controller including generator output regulating means operable by said controller for varying the excitation of one of said generator excitation windings to change the generator output to conform to the power demand variations of the motor for values of speed thereof outside said limited speed range, said generator regulating means including means by which the manual force required to operate it is proportional to the change in generator output above that where inherent regulation of the generator is provided.

3. A generating electric traction control system for vehicles comprising a traction motor; a generator electrically connected to the motor; a prime mover for driving the generator; prime mover output regulating means; a plurality of generator excitation windings to give inherent output regulation of the generator to satisfy the motor power demand for a limited speed range only; generator output regulating means for varying the excitation of one of the excitation windings to make the generator output characteristics conform to the motor power demand for motor speed values outside said limited speed range; and a manual controller capable of being freely moved to a plurality of positions for controlling said prime mover output regulating means so that said prime mover may be operated at any one of a plurality of speed and output values up to the maximum available output, said controller including means whereby the manual effort required for movement of the controller in a range beyond the position corresponding to the maximum available prime mover output is proportional to the distance moved to control generator output regulating means.

4. A generating electric traction control system for vehicles comprising a traction motor; a generator electrically connected to the motor, a prime mover for driving the generator, prime mover output regulating means; a plurality of self excited generator excitation windings; a separately excited excitation winding for the generator; generator output varying means including means normally holding said generator output varying means in a given setting for limiting the excitation of said self excited winding and capable of exerting force in proportion to changes in output due to said generator varying means; and a manual controller for initially controlling said prime mover output regulating means and for subsequently controlling said generator output regulating means.

5. A generating electric traction control system for vehicles comprising a plurality of traction motors; a generator electrically connected to the motors; a prime mover for driving the generator; output regulating means for said prime mover; electromagnetic means for controlling the prime mover output regulating means; a plurality of generator excitation windings included in the generator to give inherent regulation thereof corresponding to the power demand of the motors for a limited speed range thereof; generator output regulating means for varying the excitation of said generator excitation, said means including a source of energy, a variable resistance in series between said source of energy and one of said excitation windings, and means for normally maintaining said variable resistance at a given value and opposing variation in said resistance to increase the excitation and output of said generator in proportion to the increase in generator output to satisfy the power demand of said motors for values of speed outside said limited range; and a controller having a member movable manually for controlling the energization of said electromagnetic means and said generator output varying means.

6. A generating electric traction control system for a vehicle comprising a plurality of traction motors in which the volt-ampere demand is constant over the operating speed range of the motors; a generator constituting a source of power for said motors; regulating means for the generator to cause the generator characteristics to correspond to the motor demand characteristics, said regulating means comprising a plurality of generator excitation windings capable of giving inherent regulation of the generator to supply the motor demand for a limited range in motor speeds when certain of said windings are self excited and at least one of said windings is separately excited; a source of excitation for said separately excited winding; a variable resistance included in series between said source and said winding having a member capable of movement to cause variation in said resistance to make the generator characteristics correspond to the motor demand characteristics outside said limited speed range of the motors; means normally holding said movable member fixed and resiliently opposing movement thereof with a force proportional to the movement; a prime mover for driving the generator, the output of which is substantially equal to the motor volt-ampere demand; and manual means for moving said movable member of said variable resistance.

7. In a generating electric traction system for a vehicle, comprising a prime mover generator power plant, a traction motor electrically connected to the generator, generator output regulating means and a manually operable controller for controlling said output regulating means, said controller having resilient means opposing movement thereof with a force proportional to the change in generator output.

8. In a generating electric traction system for a vehicle, comprising a prime mover, output regulating means therefor, a generator driven by the prime mover, output regulating means for the generator, a traction motor supplied with power from the generator for driving the vehicle, and manual means for causing sequential control of said prime mover and generator output regulating means, said manual means having resilient means associated therewith to oppose movement thereof in controlling said generator output regulating means with a force proportional to the change in generator output.

9. In a generating electric traction system for a vehicle, comprising a traction motor for driving the vehicle, and a prime mover driven generator supplying power to the motor, said generator having an excitation system including manually adjustable excitation regulating means and resilient means connected thereto to normally bias said adjustable means to one position of adjustment and to exert a force proportional to the extent of adjustment of said manually adjustable means from the position to which it is biased by said resilient means.

10. In a generating electric traction system for a vehicle comprising a traction motor, a generator supplying power to the motor, a prime mover for driving the generator, said generator having an excitation system including adjustable excitation regulating means for regulating the generator output and resilient means for biasing said adjustable means to a given position of adjustment and for opposing adjustment from said given position with a force proportional to the change in the generator excitation and output, said prime mover having means for regulating the output thereof and manual means for controlling the means for regulating the prime mover output and to actuate the adjustable excitation regulating means independently of said prime mover output regulating means.

RICHARD M. DILWORTH.